(12) United States Patent
Ohashi et al.

(10) Patent No.: US 11,122,175 B2
(45) Date of Patent: Sep. 14, 2021

(54) PRINTING APPARATUS

(71) Applicant: CANON KABUSHIKI KAISHA, Tokyo (JP)

(72) Inventors: Takakazu Ohashi, Kawasaki (JP); Hideyuki Nozawa, Utsunomiya (JP); Itaru Wada, Yokohama (JP); Ryo Harigae, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 16/742,936

(22) Filed: Jan. 15, 2020

(65) Prior Publication Data
US 2020/0236236 A1 Jul. 23, 2020

(30) Foreign Application Priority Data
Jan. 18, 2019 (JP) .............................. JP2019-006875

(51) Int. Cl.
*H04N 1/00* (2006.01)

(52) U.S. Cl.
CPC ..... *H04N 1/00535* (2013.01); *H04N 1/00551* (2013.01); *H04N 1/00572* (2013.01)

(58) Field of Classification Search
CPC ........... H04N 1/00535; H04N 1/00572; H04N 1/00551
See application file for complete search history.

(56) References Cited

U.S. PATENT DOCUMENTS

2011/0211210 A1* 9/2011 Niihara .............. H04N 1/00679
358/1.12
2015/0347874 A1 12/2015 Mukaiyama et al.

FOREIGN PATENT DOCUMENTS

JP 2016-005895 A 1/2016

\* cited by examiner

*Primary Examiner* — Christopher Wait
(74) *Attorney, Agent, or Firm* — Venable LLP (57) ABSTRACT

A document reading apparatus of a printing apparatus includes a document setting unit and a reading unit, the document reading apparatus being provided at a higher position compared to a printing unit. The document setting unit includes a supporting surface configured to support a document, and the reading unit is configured to read the document conveyed from the document setting unit. The document reading apparatus moves to a reading position and to a retracted position at which the document reading apparatus is retracted from the reading position. Furthermore, the printing apparatus includes a cover member configured to cover the printing unit. The cover member includes an outer surface configured to support and guide the document together with the supporting surface in a case where the document reading apparatus is at the reading position.

14 Claims, 11 Drawing Sheets

PRINTING APPARATUS

BACKGROUND OF THE INVENTION

Field of the Invention

The present invention relates to a printing apparatus including a printing unit that performs recording on a sheet and a document reading apparatus that performs reading of a document.

Description of the Related Art

Nowadays, a printing apparatus having complex functions for recording on a sheet of a size in a large-format, which is A2 or larger, for reading a document of a size in such a large-format, etc., has been proposed and implemented. As such a printing apparatus, Japanese Patent Laid-Open No. 2016-005895 discloses a large-size printing apparatus provided with a reading apparatus, which reads a document of a size in a large-format, above a storage unit for a roll sheet provided on the printing apparatus.

As described in Japanese Patent Laid-Open No. 2016-005895, in the reading apparatus that is capable of reading a document of a size in a large-format, there is provided a document setting unit that extensively protrudes forward from an insertion slot of the reading apparatus, so as to optimize favorability in setting the document of a size in a large-format and in supporting and guiding the set document. For this reason, there is an issue of the reading apparatus becoming large.

SUMMARY OF THE INVENTION

According to an embodiment of the present invention, a printing apparatus comprises a supporting portion configured to support a sheet; a printing unit configured to perform printing on the sheet supplied from the supporting portion; a document reading apparatus including a document setting unit and a reading unit, the document reading apparatus being provided at a higher position compared to the printing unit, the document setting unit including a supporting surface configured to support a document, the reading unit being configured to read the document conveyed from the document setting unit, wherein the document reading apparatus moves to a reading position, in which reading of the document is performed, and to a retracted position, in which the document reading apparatus is retracted from the reading position; and a cover member that is partially at a higher position compared to a lower part of the document reading apparatus, the cover member being configured to cover the printing unit, wherein the cover member includes an outer surface configured to support and guide the document together with the supporting surface in a case where the document reading apparatus is at the reading position.

According to an embodiment of the present invention, a document reading apparatus provided in a printing apparatus can be made smaller.

Further features of the present invention will become apparent from the following description of exemplary embodiments with reference to the attached drawings.

DESCRIPTION OF THE EMBODIMENTS

Hereinafter, an explanation is given of embodiments of the present invention with reference to the drawings. Note that, throughout the drawings, the same or corresponding parts are assigned with the same signs. Furthermore, in the drawings, X and Y indicate two axis directions orthogonal to each other on the horizontal plane, and Z indicates the vertical direction. Moreover, Y1 and Y2 are directions parallel to the Y axis direction. Further, Y1 indicates the conveyance direction of a document in the reading apparatus 3, which is described later, and Y2 indicates the opposite direction of Y1, respectively. Furthermore, Z1 indicates downward in the vertical direction, and Z2 indicates upward in the vertical direction.

First Embodiment

Figure 1:
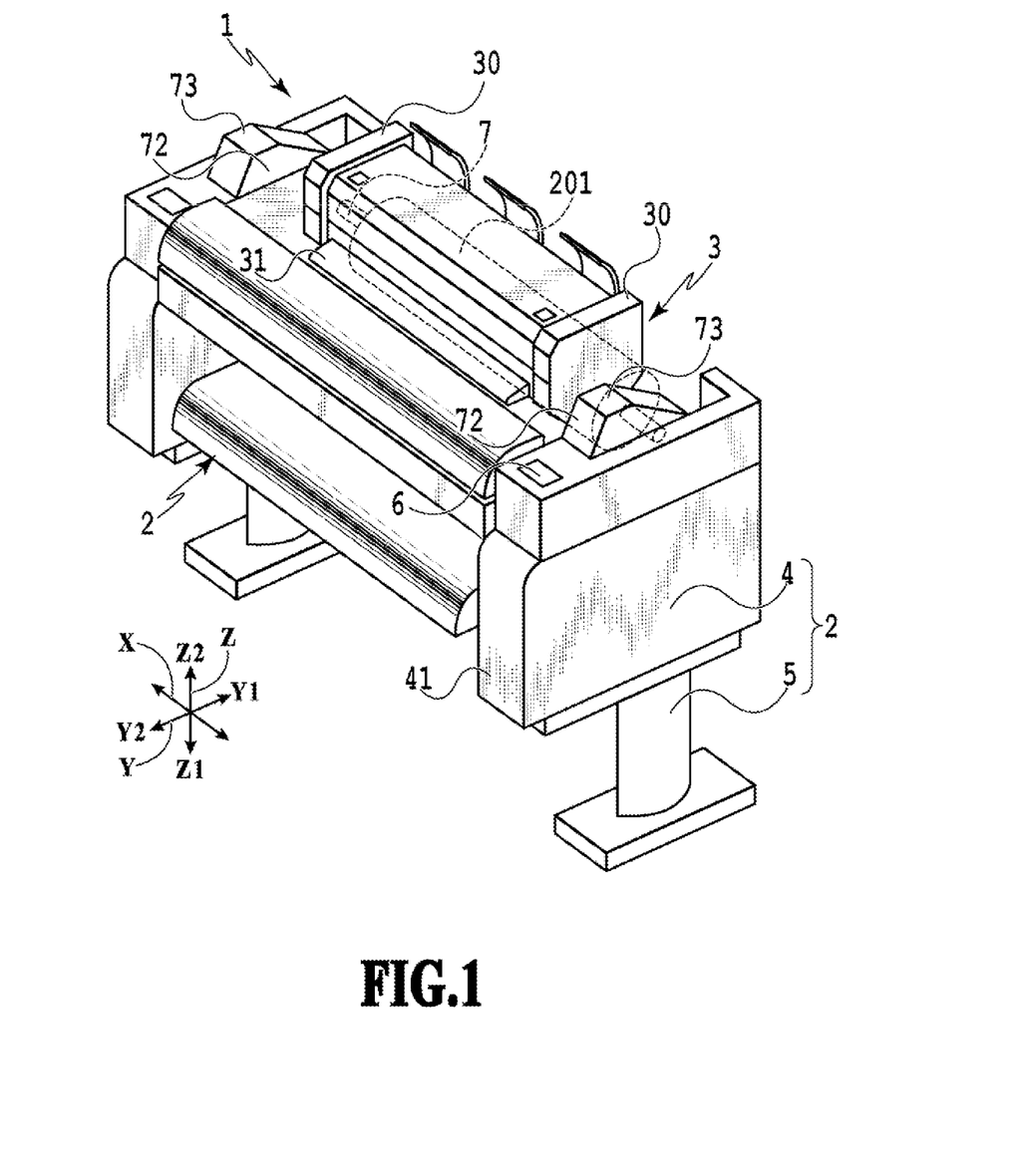
FIG. 1 is a schematic perspective view illustrating a printing apparatus according to an embodiment of the present invention.

FIG. 1 is a schematic perspective view illustrating a printing apparatus according to the present embodiment. In FIG. 1, the configuration of the printing apparatus 1 includes the printing section 2 that performs recording on a sheet and the reading apparatus (document reading apparatus) 3 that reads an image, or the like, formed on a document. The printing section 2 includes the main body part 4 that holds each of the later-described mechanisms, and a leg part 5 that holds the main body part 4 at a position with a predetermined height. The reading apparatus 3 is held above the main body part 4 by the moving unit 80 (see FIG. 5), which is provided on the printing section 2. The outer-casing portion 41 that is the outer case of the main body part 4 is provided with the operation panel 6, which is used for inputting various setting operations and commands, checking information related to the printing section 2 and the reading apparatus 3, etc.

Figure 2:
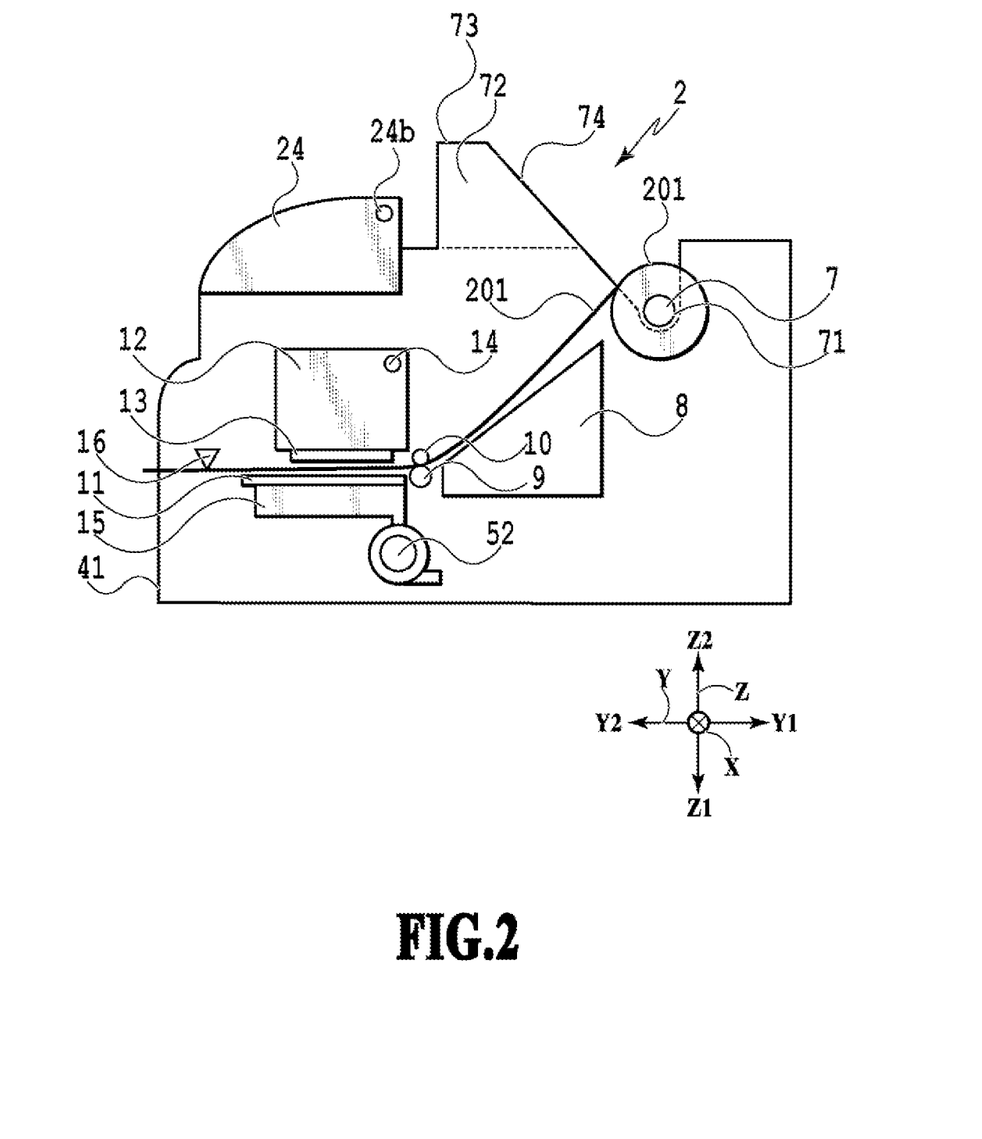
FIG. 2 is a schematic cross-sectional view of a printing section.

Next, with reference to FIG. 2, an explanation is given of a schematic configuration of the printing section 2. FIG. 2 is a schematic cross-sectional view of the printing section 2 of the present embodiment. The printing section 2 is capable of selectively recording an image on a sheet supplied from the roll sheet 201 and a cut sheet fed from a loading unit (not illustrated in the drawing).

Figure 4:
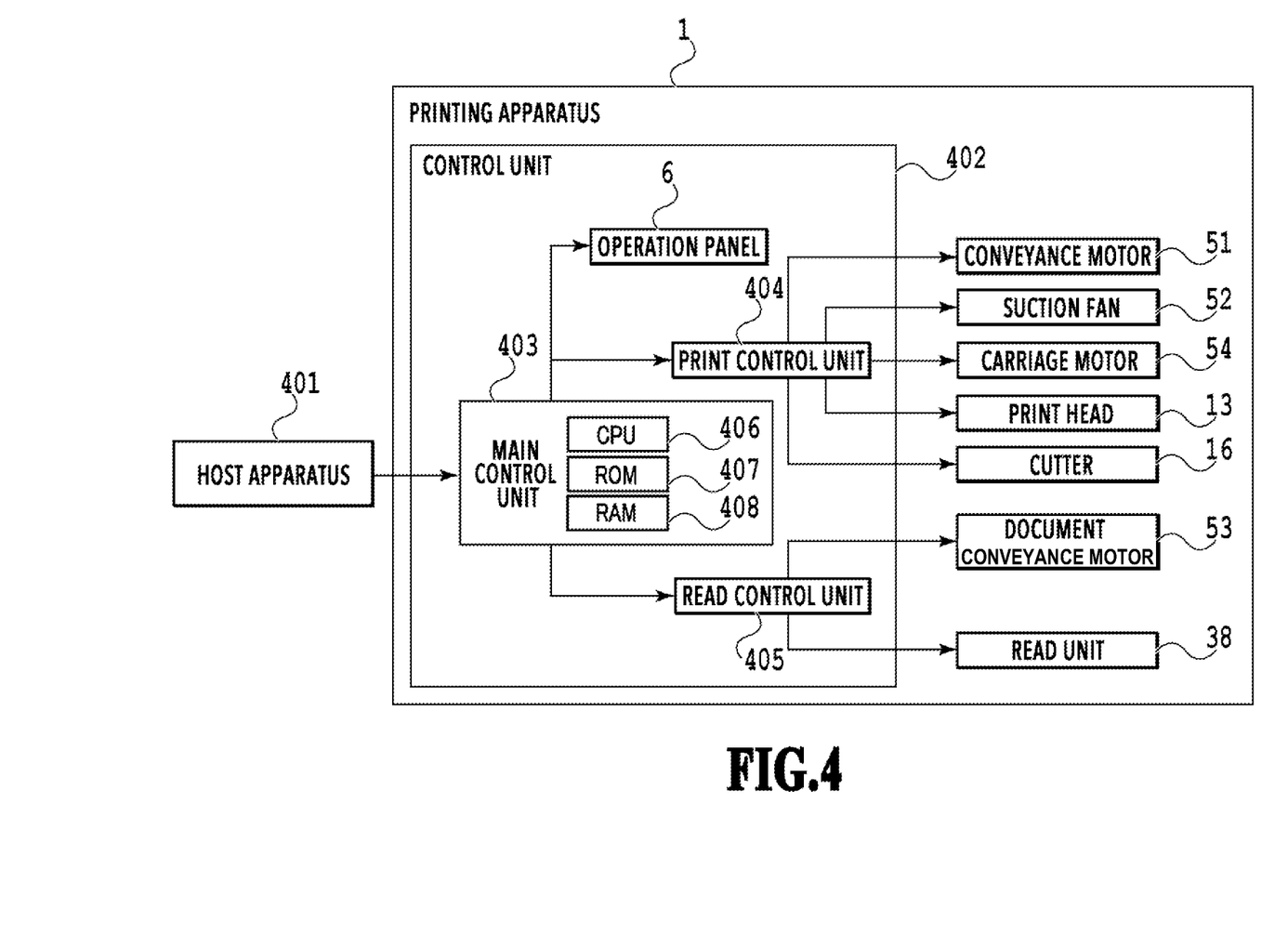
FIG. 4 is a block diagram illustrating a schematic configuration of a control system.

In a case of recording an image on the roll sheet 201, first, the user attaches the roll holder 7 to the central hole of the roll sheet 201 and makes the roll holder 7 be pivotally supported by the supporting portion 71 (FIG. 2), which is provided in the printing section 2. After making the roll holder 7 be supported by the supporting portion 71, a sheet pulled out from the roll sheet 201 is fed by the user to the downstream side along the top surface of the bottom guide 8. Here, in a case where the leading edge of the roll sheet 201 reaches the nipping part between the conveyance roller 9 and the follower roller 10, the conveyance roller 9 is rotated by the conveyance motor 51 (FIG. 4). Accordingly, the sheet is nipped between the conveyance roller 9 and the follower roller 10. Then, the sheet is conveyed to the platen 11 by the rotation of the conveyance roller 9.

The platen 11 supports a sheet from the back surface to keep the sheet in a flat state, so that a gap suitable for recording is maintained between the sheet and the recording head 13, which is a printing unit. In order to prevent the sheet from floating, being distorted, or the like, at the platen 11, multiple air suction holes are formed in the platen 11 for suctioning the sheet. The air suction holes communicate with the suction fan 52 via the duct 15. By driving the suction fan 52, negative pressure is generated at the air suction holes of the platen 11, so that the sheet passing over the platen 11 moves on the platen 11 while being suctioned through the air suction holes.

The carriage 12 reciprocally moves in the X direction (main scanning direction) along the carriage shaft 14. The carriage 12 is mounted with the recording head 13. In the recording head 13, an array of multiple ejection openings for ejecting ink is provided along a direction crossing the X direction (in the present embodiment, the orthogonal direction, that is, Y direction).

While moving in the X direction together with the carriage 12, the recording head 13 ejects ink from the ejection openings according to recording data. As a result, an image having the width corresponding to the number of arrayed ejection openings (an image for one band) is recorded on the sheet. After an image for one band is recorded, the sheet is conveyed by a predetermined distance in the Y direction by rotation of the conveyance roller 9. Then, movement of the carriage 12 and ejection of ink by the recording head 13 are performed again, so as to record an image for the next band. By repeating the recording operation on the sheet and the conveying operation of the sheet, a predetermined image (for example, an image for one page) is recorded on the sheet.

As described above, the printing section 2 in the present embodiment is configured to be what is termed as a serial-type printer, which performs recording on a sheet while moving the recording head 13. Furthermore, the cutter 16 is provided inside the main body part 4 on the downstream side relative to the recording head 13 in the conveyance direction (Y direction), so that it is possible to cut the sheet pulled out from the roll sheet 201 into a predetermined length.

Note that, in a case where a cut sheet is used as a recording medium, cut sheets loaded in a loading unit (not illustrated in the drawing) are fed one by one to the nipping part between the conveyance roller 9 and the follower roller 10. The recording operation is performed in the same manner as the case in which the roll sheet 201 is used.

Figure 9:
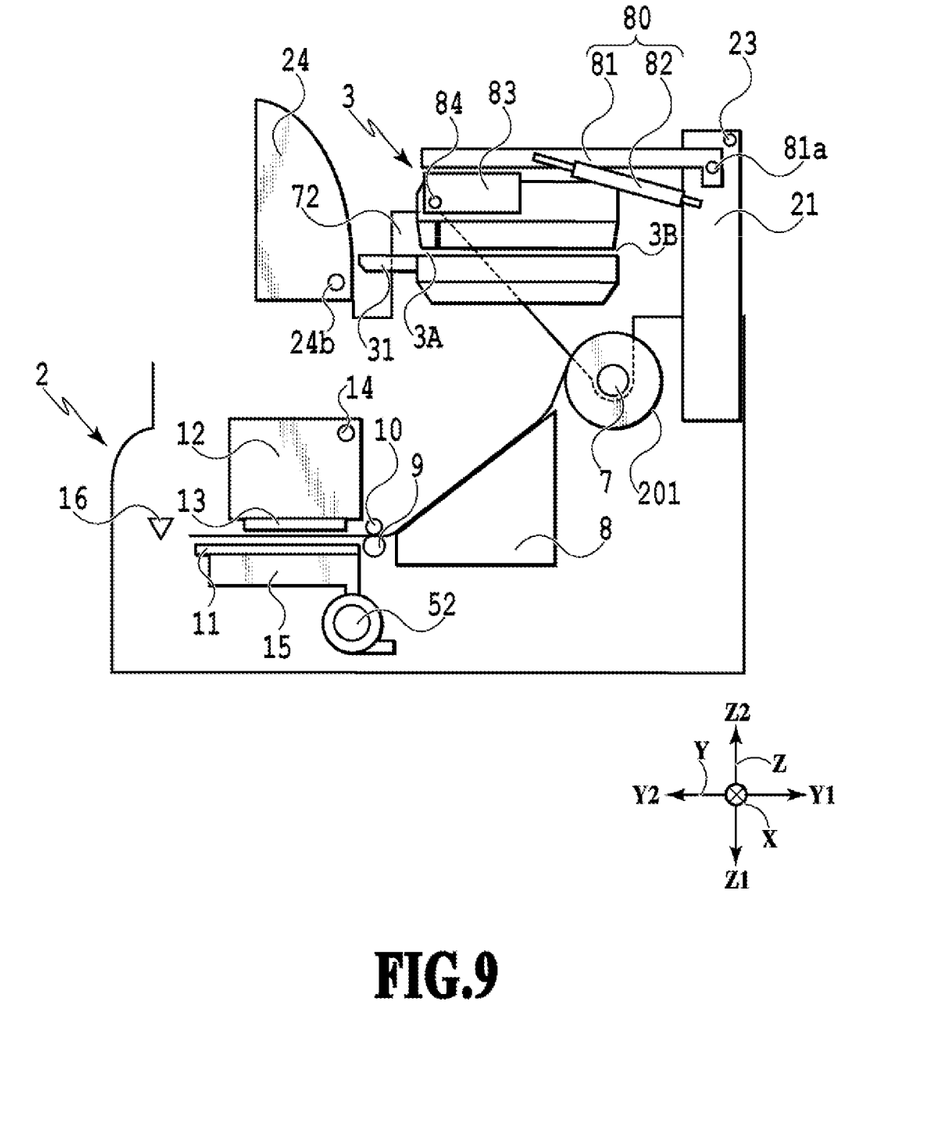
FIG. 9 is a schematic cross-sectional view illustrating a state in which an upper cover is moved to an open position.
Figure 10:
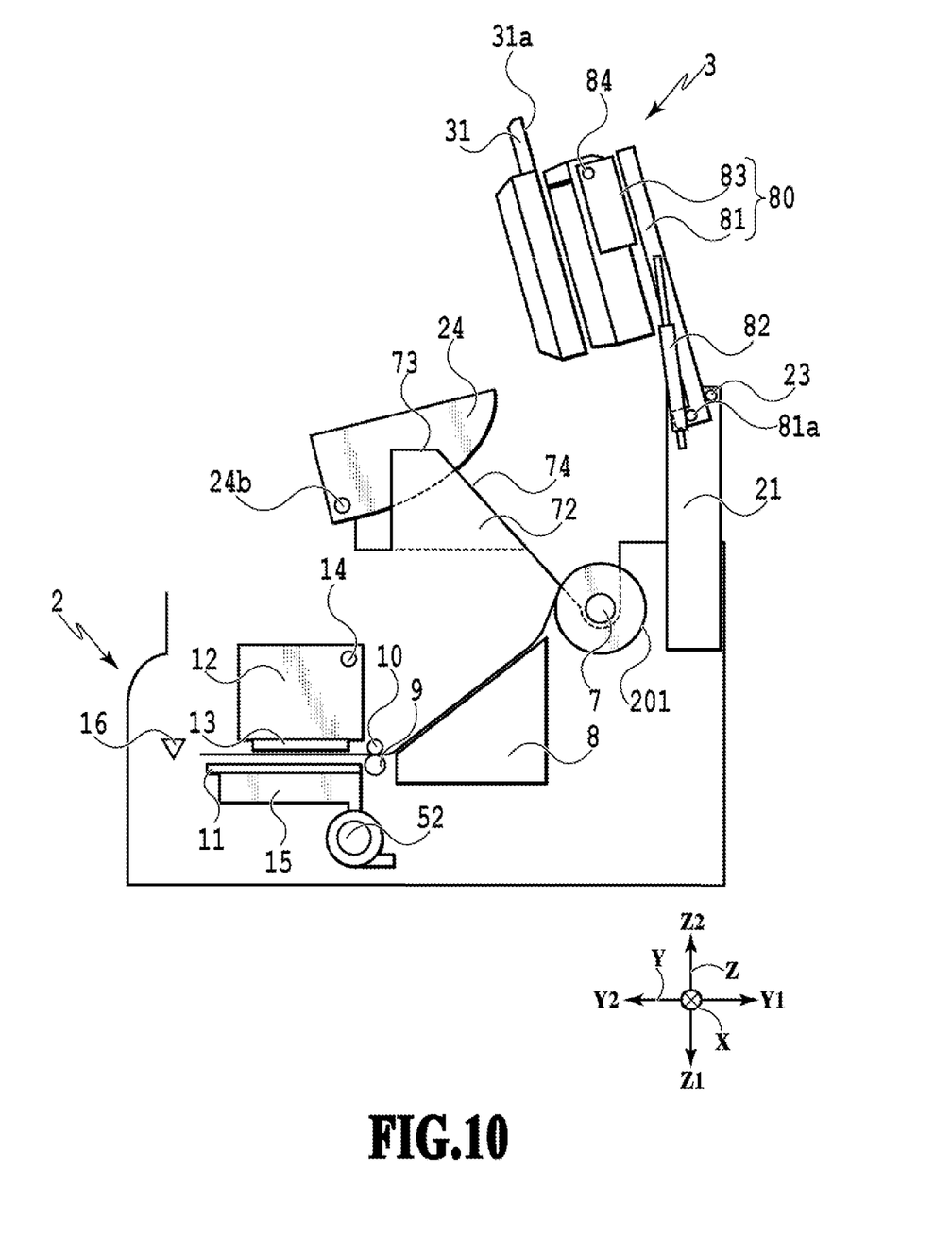
FIG. 10 is a schematic cross-sectional view illustrating a state in which the upper cover is moved to the open position with the reading apparatus in the retracted position.

At the upper part on the front side of the outer-casing portion 41 of the main body part 4, the upper cover (cover member) 24 that covers the upper side of the recording head 13 is provided so as to be rotatable about the rotational center 24*b*. Therefore, the upper cover 24 is capable of rotationally moving to a closed position, in which the upper side of the recording head 13 is covered as illustrated in FIG. 2, and to an open position, in which the recording head 13 is open to the outside as illustrated in FIG. 9 or FIG. 10. Note that the configuration and operation of the upper cover 24 are explained later in detail.

Figure 3:
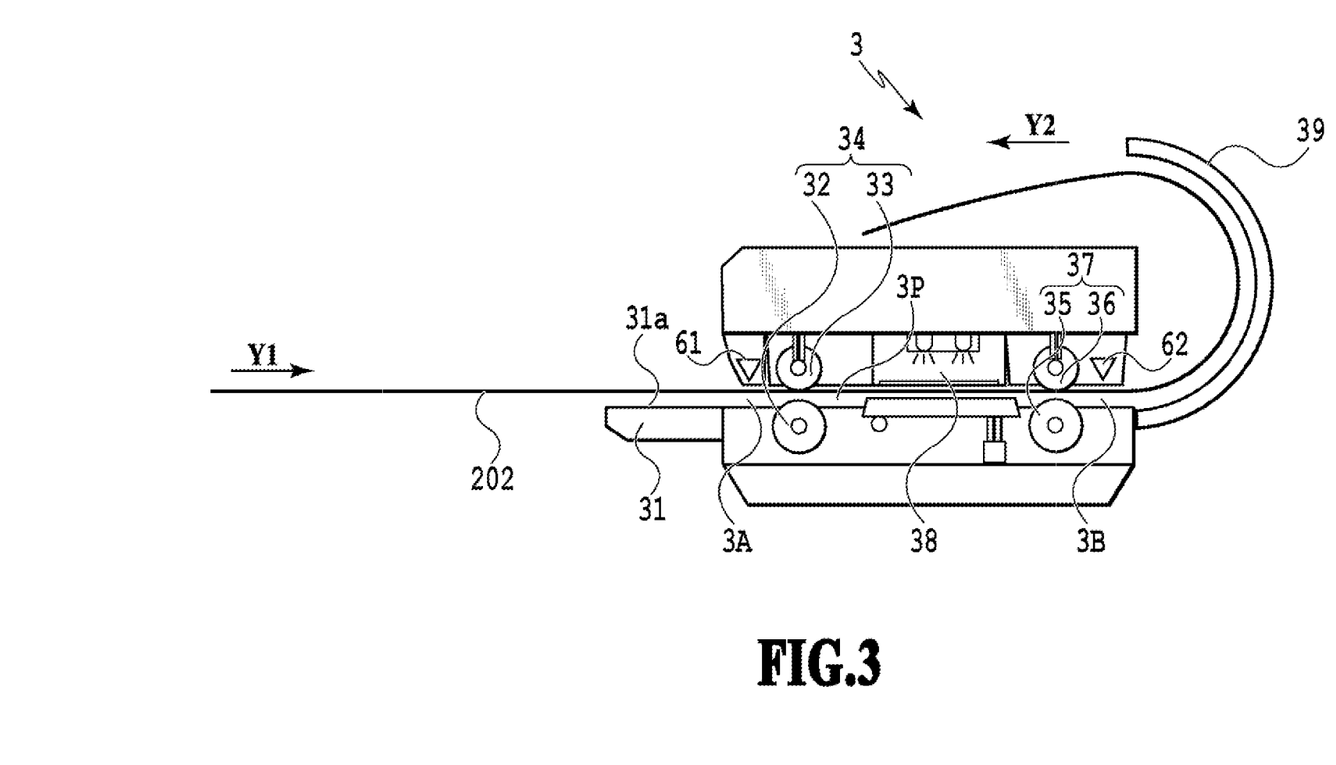
FIG. 3 is a schematic cross-sectional view of a reading apparatus.

Next, with reference to FIG. 3, an explanation is given of a schematic configuration of the reading apparatus 3 in the present embodiment. Note that FIG. 3 is a schematic cross-sectional view of the reading apparatus 3 illustrated in FIG. 1. In FIG. 3, the reading apparatus 3 reads an image by use of the reading unit 38 while conveying the document 202. The reading apparatus 3 is provided with the conveyance route 3P extending from the insertion slot 3A for inserting a document to the discharging port 3B for discharging the document. A document inserted from the insertion slot 3A is conveyed along the conveyance route 3P. The reading apparatus 3 is provided with the document setting unit 31 that is in a flat plate shape protruding forward (leftward in FIG. 3) from the bottom edge part of the insertion slot 3A. The document setting unit 31 has approximately the same width (length in the X direction) as the insertion slot 3A. The document setting unit 31 supports a document from the non-reading surface side, which is the surface opposite to the reading surface of the document, and guides insertion of the document into the insertion slot 3A. Further, on the back side (right side in FIG. 3) of the reading apparatus 3, there is provided the document discharging unit 39 that is in a curved shape for guiding a document discharged from the document discharging port to the top surface of the reading apparatus 3. The upstream side conveyance unit 34 is provided on the upstream side in the conveyance route 3P, and the downstream side conveyance unit 37 is provided on the downstream side. A document is conveyed along the conveyance route 3P by the conveyance units 34 and 37. The upstream side conveyance unit 34 is configured with the upstream side conveyance roller 32 and the upstream side follower roller 33, which is provided so as to face the upstream side conveyance roller 32. The downstream side conveyance unit 37 is configured with the downstream side conveyance roller 35 and the downstream side follower roller 36, which is provided so as to face the downstream side conveyance roller 35.

The reading unit 38 for reading a document is provided between the upstream side conveyance unit 34 and the downstream side conveyance unit 37. The reading unit 38 is configured with a CIS (Contact Image Sensor) in which an array of light receiving elements is provided in the width corresponding to a large-format document to be used. However, it is also possible to use another linear sensor provided with a CCD, or the like.

In a case where reading of a document is performed by the reading apparatus 3, the user places the front part of the document 202 on the document setting unit 31 and inserts the document 202 into the insertion slot 3A along the guide surface (top surface) 31*a* of the document setting unit 31. In a case where the leading edge of the document 202 is inserted from the insertion slot 3A into the conveyance route 3P, the upstream document sensor 61 that is provided in the vicinity of the insertion slot 3A detects the document, so as to detect that the document 202 is inserted in the insertion slot 3A. In a case where the leading edge of the document 202 reaches the nipping part of the upstream side conveyance unit 34, which is configured with the upstream side conveyance roller 32 and the upstream side follower roller 33, the upstream side conveyance roller 32 is rotated in the normal direction by the document conveyance motor 53 illustrated in FIG. 4. Accordingly, the document 202 enters and is nipped between the upstream side conveyance roller 32 and the upstream side follower roller 33. Note that, in the present embodiment, there is provided a delay time from when the upstream document sensor 61 detects the leading edge of the document 202 to when the upstream side conveyance roller 32 is rotationally driven. The delay time corresponds to a standby time until the whole area in the width direction of the leading edge of the document 202 comes into contact with the nipping part of the upstream side conveyance unit 34. By rotating the upstream side conveyance roller 32 in such a state where the whole area of the leading edge of the document 202 is in contact with the nip, it is possible to reduce the possibility that the document 202 is conveyed in such a state where the leading edge thereof is obliquely set to the upstream side conveyance roller 32. 0.5 to 2 seconds is suitable for the delay time. However, the optimum value of the delay time varies depending on the distance between the upstream document sensor 61 and the upstream side conveyance unit 34.

As the upstream side conveyance roller 32 is rotationally driven, the document 202 is conveyed to the reading unit 38. Then, the document 202 is nipped between the downstream side conveyance roller 35, which is rotated in the normal direction by the document conveyance motor 53 as with the upstream side conveyance roller 32, and the downstream side follower roller 36, and is conveyed until the downstream document sensor 62 detects the document 202. Meanwhile, as a pre-detection operation, the reading unit 38 executes a reading operation of the document 202 passing through the reading area of the reading unit 38. Information related to the width and inclination of the document 202 is acquired by the reading operation. Upon completion of the pre-detection operation, the document conveyance motor 53 rotates the upstream side conveyance roller 32 and the downstream side conveyance roller 35 in the opposite direction to return the document 202 to the upstream side, so as to be in a standby state. Note that, in the document returning operation, the position of the leading edge of the document 202 in the standby state is controlled to be on the downstream side relative to the nipping part of the upstream side conveyance unit 34 in the conveyance direction (Y1 direction) as well as on the upstream side relative to the reading area of the reading unit 38.

After the pre-detection operation is completed, in a case where a reading operation starting command is input through the operation panel 6, or the like, which is provided on the printing section 2, the document 202 is conveyed in the document conveyance direction Y1 by the upstream side conveyance unit 34 and the downstream side conveyance unit 37 while the document reading operation is executed by the reading unit 38. In a case where the upstream document sensor 61 detects the trailing edge of the document 202, the trailing edge of the document 202 is conveyed to a position that is on the downstream side relative to the reading area of the reading unit 38 in the conveyance direction (Y1 direction) as well as on the upstream side relative to the nipping part of the downstream side conveyance unit 37. In this state, the document reading operation ends. Then, in a case where a discharge operation starting command is input through the operation panel 6, or the like, the document 202 is conveyed again by the downstream side conveyance unit 37 and released from the nipping by the downstream side conveyance unit 37. Accordingly, the document 202 can be taken out. Note that the document 202 that has passed through the document discharging unit 39 is reversely conveyed in the conveyance direction Y2, which is the opposite direction of the conveyance direction (Y1 direction), and is discharged to the top surface side of the reading apparatus 3. Therefore, it is possible for the user to perform the operation of inserting the document 202 into the insertion slot 3A and the operation of taking out the read document 202 from the same direction (from the front side), which makes favorable operability possible. In the present embodiment, after the document reading operation ends, the conveying operation of the document 202 is temporarily stopped in such a state where the document 202 is nipped by the downstream side conveyance unit 37. However, it is also possible that the conveying operation of the document 202 is not stopped after the document reading operation ends, so that the conveying operation continues until the document 202 is released from the nipping by the downstream side conveyance unit 37.

Next, with reference to the block diagram illustrated in FIG. 4, an explanation is given of a schematic configuration of the control system according to the present embodiment. The host apparatus 401 is connected to the printing apparatus 1, so that various control commands and recording data generated by the host apparatus 401 are transmitted to the control unit 402. The control unit 402 mainly includes the main control unit 403, the recording control unit 404, the reading control unit 405, etc. The main control unit 403 includes the CPU 406, the ROM 407, and the RAM 408. The CPU 406 performs various calculations according to various programs and parameters stored in the ROM 407 by use of the RAM 408 as a work area, in order to comprehensively control the printing apparatus 1. The recording control unit 404 controls the conveyance motor 51, the suction fan 52, the carriage motor 54, the recording head 13, the cutter 16, and the like, based on instructions from the main control unit 403. The reading control unit 405 controls the document conveyance motor 53, the reading unit 38, and the like, based on instructions from the main control unit 403.

Figure 5:
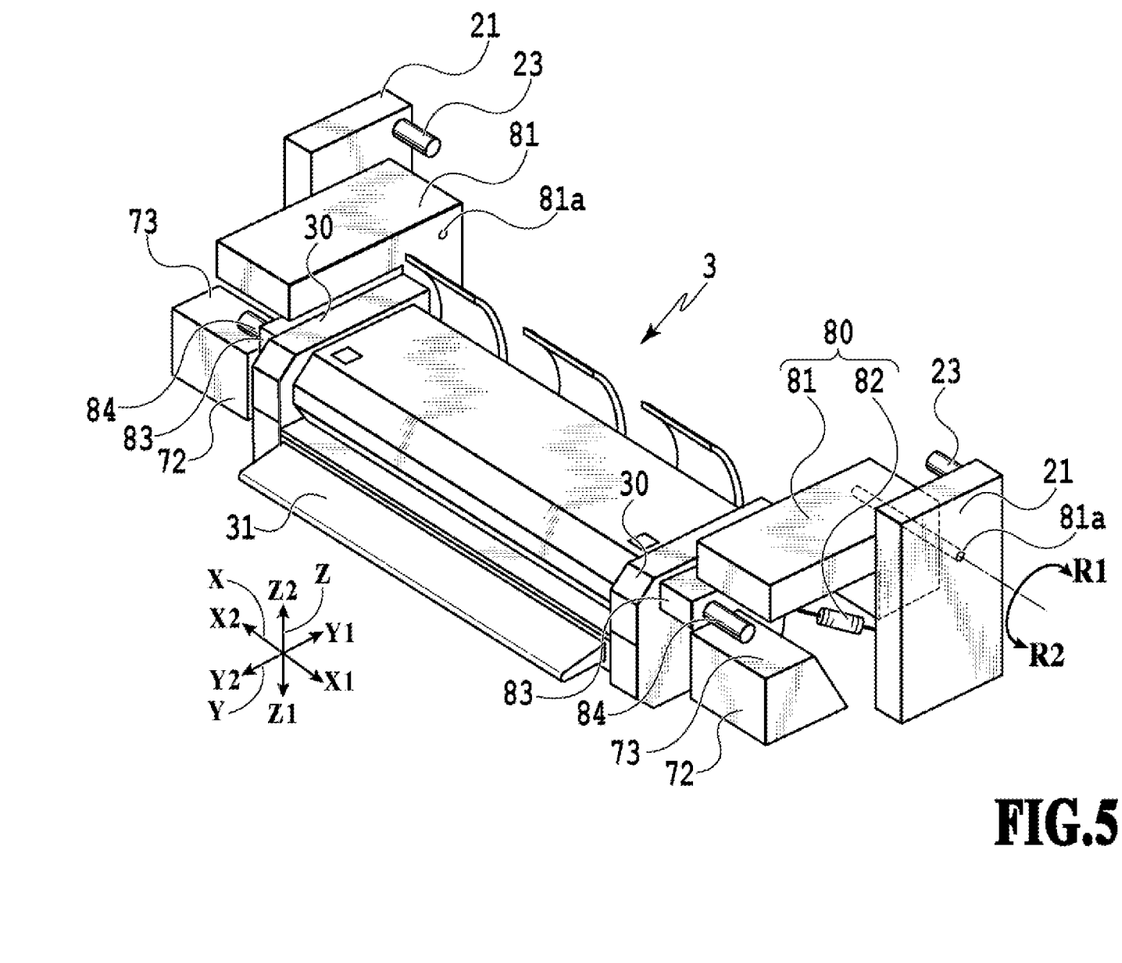
FIG. 5 is a schematic perspective view illustrating a configuration of moving units of the reading apparatus.

Next, with reference to FIG. 5, an explanation is given of the moving units 80 of the reading apparatus 3 in the present embodiment. Note that FIG. 5 is a schematic perspective view illustrating the configuration of moving units 80. In a case of executing the reading operation of a document, the reading apparatus 3 is held by the moving units 80 at the reading position illustrated in FIG. 5.

Regarding the configuration of the moving units 80, a pair of moving units 80 is provided on both the left and right sides of the reading apparatus 3, respectively. Each of the moving units 80 has the same configuration except that the moving units 80 are left-right reversals. Therefore, here, an explanation is given of one of the moving units 80. A moving unit 80 includes a turning arm 81 and an urging member 82. The turning arm 81 is attached to a mounting member 21 provided on the printing section 2, so that the turning arm 81 is rotationally movable in a normal direction (R2 direction) and the opposite direction (R1 direction) with the rotational axis 81a as the center. The urging member 82 is configured to urge the turning arm 81. One end portion of the turning arm 81 is fixed to a connection member 83 provided on a side plate 30 of the reading apparatus 3, so that the reading apparatus 3 rotationally moves in the R1 direction and in the R2 direction together with the turning arm 81 with the rotational axis 81a as the center.

Furthermore, the connection member 83 is provided with a turning regulating member 84 that is protruding outward. The turning regulating member 84 abuts on a temporary placement portion 73, which corresponds to the top surface of a temporary placement table 72 provided on each of both sides of the printing section 2, so as to regulate rotation of the turning arm 81 in the normal direction (R2 direction). In a state where the turning regulating member 84 abuts on the temporary placement portion 73, the reading apparatus 3 is held at the reading position illustrated in FIG. 5 and FIG. 8. As described above, the temporary placement table 72 functions as a reading position regulating member that holds the reading apparatus 3 at the reading position.

Furthermore, a retracted position regulating member 23 is provided as a protrusion from the mounting member 21. The retracted position regulating member 23 abuts on the turning arm 81, so that rotation of the turning arm 81 in the opposite direction (R1 direction) is regulated and the reading apparatus 3 is held at the retracted position illustrated in FIG. 6.

One end of the urging member 82 is pivotally connected to the turning arm 81, and the other end is pivotally connected to the mounting member 21. The urging member 82 in the present embodiment is configured with a gas spring, and the urging force thereof is determined as follows. Here, the moment with which the reading apparatus 3 rotates in the R2 direction due to its own weight is regarded as MS, and the moment with which the reading apparatus 3 rotates in the R1 direction by the urging force of the urging member 82 is regarded as MF. In a case where the reading apparatus 3 is at the reading position, the urging force of the urging member 82 is determined to be MS>MF. Therefore, the reading apparatus 3 is urged to rotate in the R2 direction, and the reading apparatus 3 becomes in a state where the turning regulating member 84 abuts on the temporary placement table 72, which is a reading position regulating member. That is, the reading apparatus 3 becomes in a state of being held at the reading position.

On the other hand, in a case where the reading apparatus 3 is at the retracted position, the urging force of the urging member 82 is determined to be MS<MF. Therefore, the reading apparatus 3 is urged to rotate in the R1 direction, and the turning arm 81 becomes in a state of abutting on the retracted position regulating member 23 provided on the printing section 2. That is, the reading apparatus 3 becomes in a state of being held at the retracted position. Note that, in the following explanation, the part positioned above the conveyance route 3P in a state where the reading apparatus 3 is at the reading position is referred to as the upper part of the reading apparatus 3. Further, the part positioned below the conveyance route 3P in the state where the reading apparatus 3 is at the reading position is referred to as the lower part of the reading apparatus 3.

Figure 6:
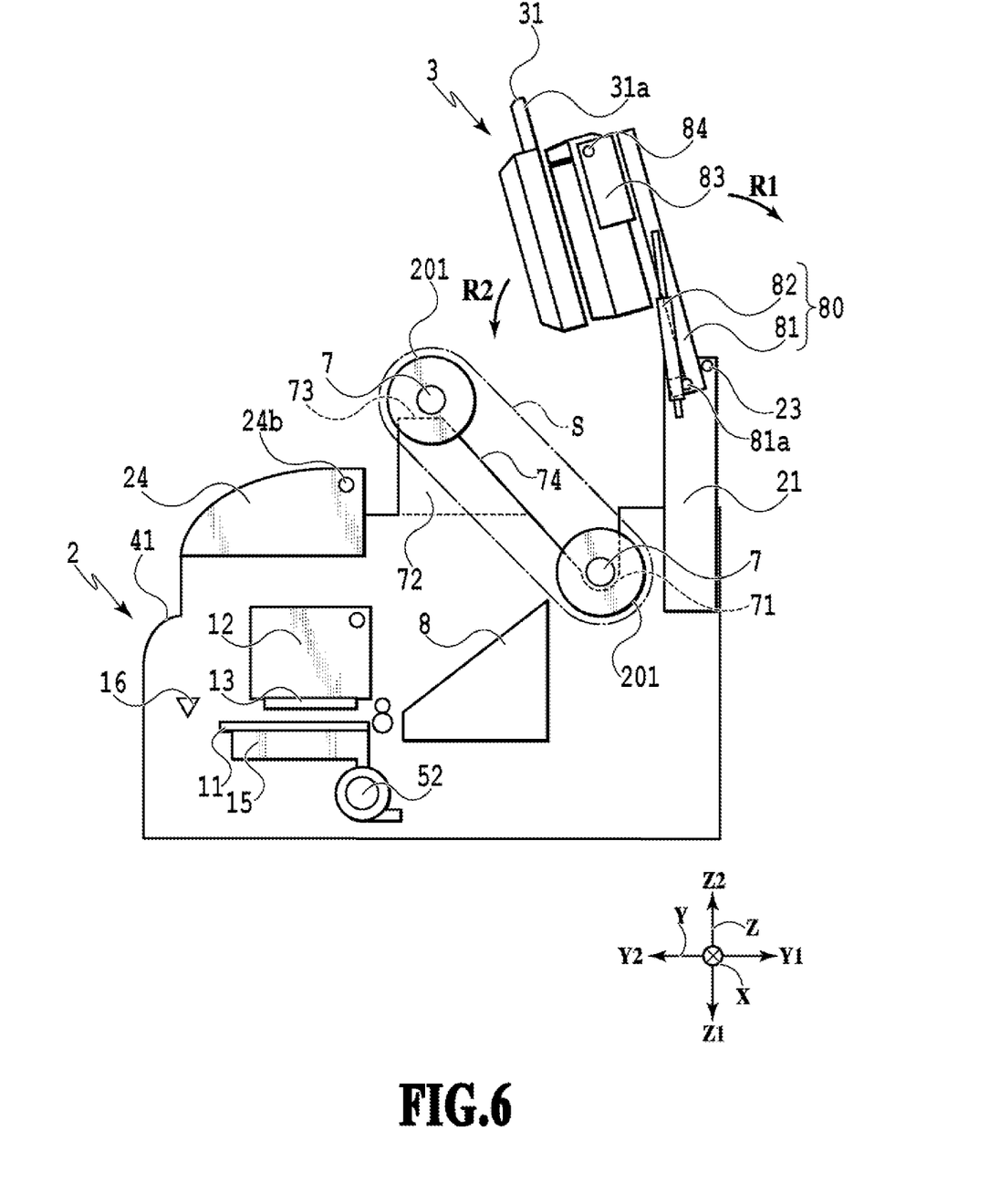
FIG. 6 is a schematic cross-sectional view illustrating a state in which the reading apparatus is moved to a retracted position.
Figure 7:
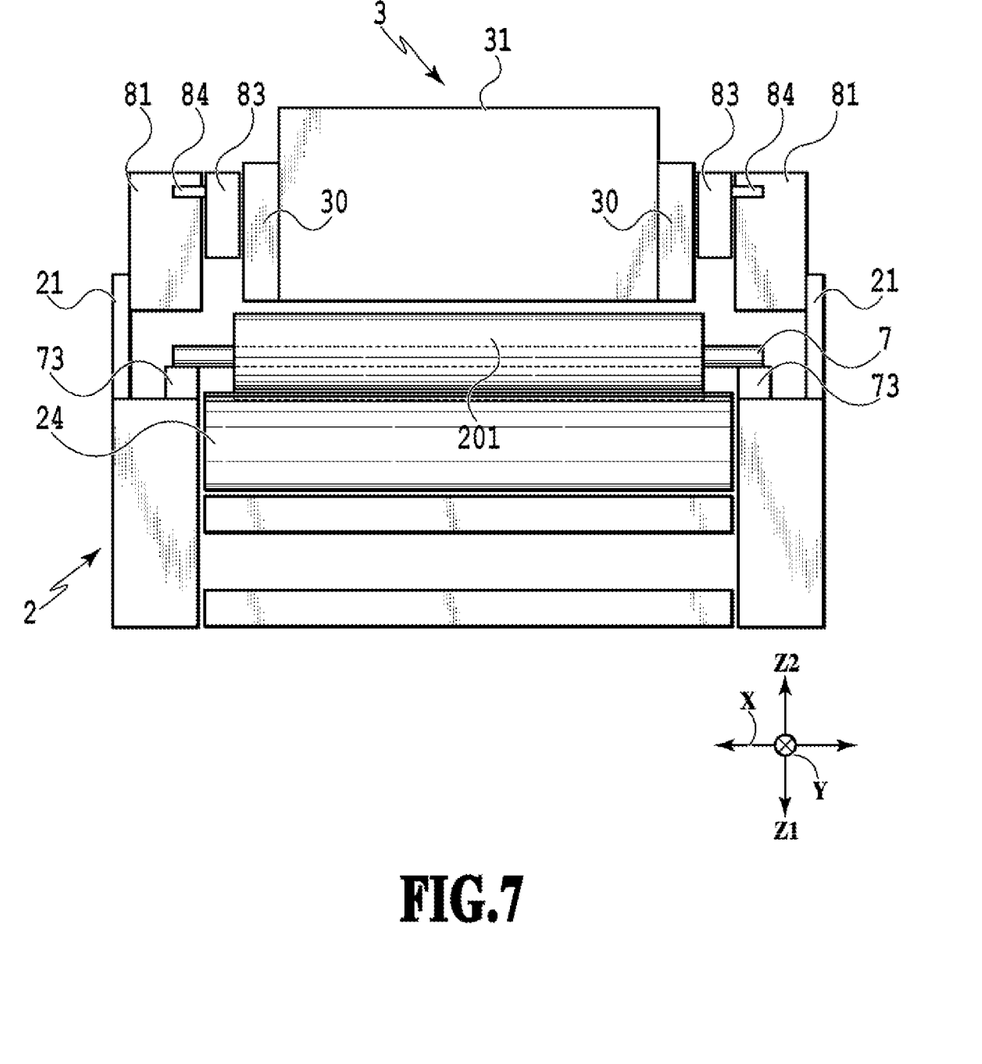
FIG. 7 is a schematic front view illustrating the state in which the reading apparatus is moved to the retracted position.
Figure 8:
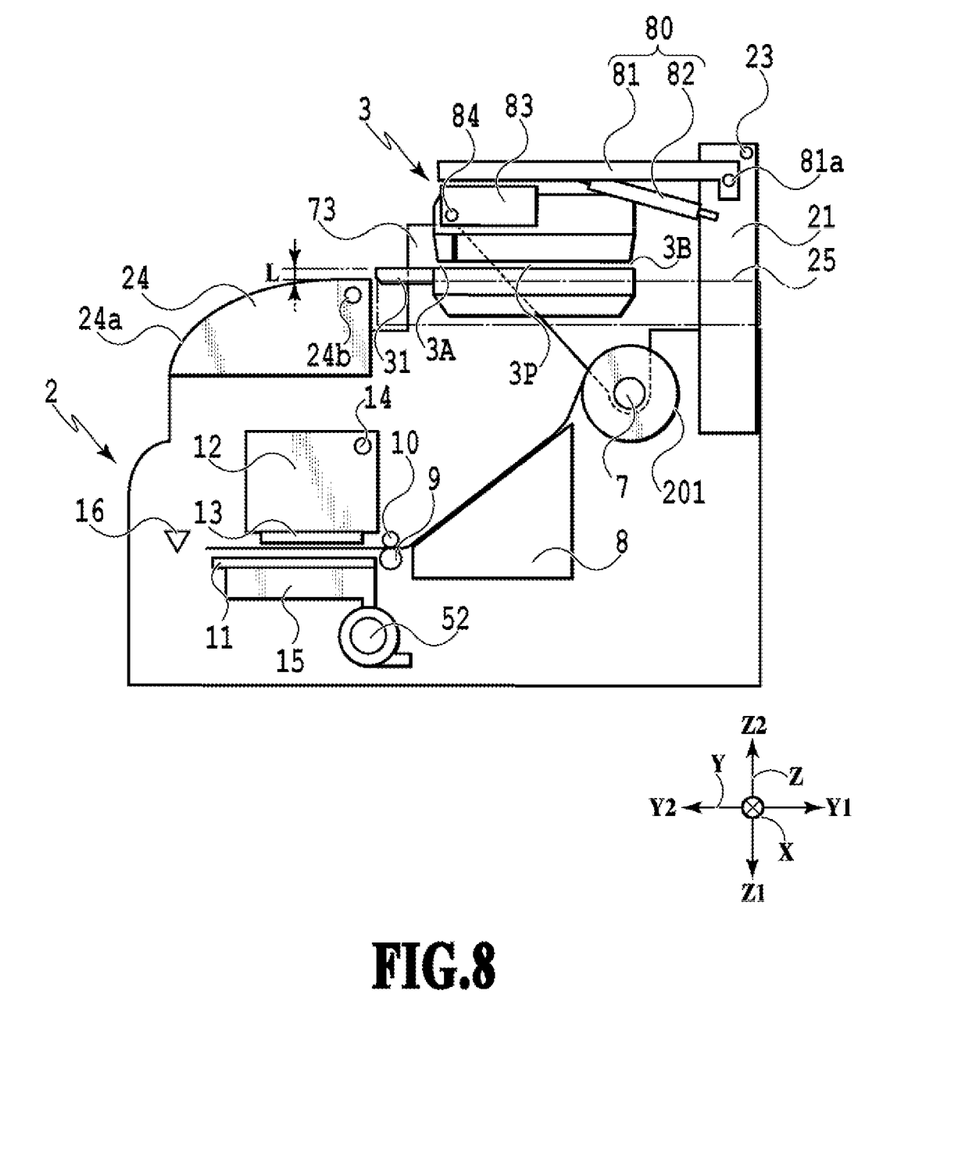
FIG. 8 is a schematic cross-sectional view illustrating a state in which the reading apparatus is moved to a reading position.

Next, with reference to FIG. 6, FIG. 7, and FIG. 8, an explanation is given of position settings of the reading apparatus 3 at the time of using the printing apparatus 1. FIG. 6 is a schematic cross-sectional view illustrating a state in which the reading apparatus 3 is moved to the retracted position. FIG. 7 is a schematic front view illustrating a state in which the reading apparatus 3 is moved to the retracted position. FIG. 8 is a schematic cross-sectional view illustrating a state in which the reading apparatus 3 is moved to the reading position. Note that, in FIG. 6 and FIG. 8, the side plates 30 provided on the reading apparatus 3 are omitted for the convenience of illustrating the configuration of the main parts of the reading apparatus 3. The same also applies to FIG. 9 and FIG. 10 described later.

As illustrated in FIG. 5 through FIG. 8, in a case of setting the roll sheet 201 on supporting portions 71 of the printing section 2, the user moves the reading apparatus 3 to the retracted position as illustrated in FIG. 6, in which the reading apparatus 3 is retracted upward from the position in which the reading apparatus 3 covers the upper part of the printing section 2. Then, the roll sheet 201 is attached to the roll holder 7, and both end portions of the roll holder 7 are placed on the temporary placement portions 73 of the temporary placement tables 72 arranged respectively on both of the left and right sides of the reading apparatus 3.

Next, the roll holder 7 on which the roll sheet 201 is attached is moved along the guide surface 74 that is inclined obliquely downward from the temporary placement portions 73 to the supporting portions 71, so that both end portions of the roll holder 7 are supported by the pair of supporting portions 71. Accordingly, the roll sheet 201 is pivotally supported inside the printing section 2 via the roll holder 7. As described above, in the setting operation for making the roll sheet 201 be supported by a supporting portion 71, a temporary placement table 72 functions as a guiding member for guiding the roll sheet 201 from a temporary placement portion 73 to the supporting portion 71.

In the setting operation of the roll sheet 201, the roll sheet 201 moves inside the space area S indicated by the dash-dotted line in FIG. 6. The space area S illustrated in FIG. 6 is the area corresponding to the locus of the movement of the roll sheet 201 with the maximum diameter and the maximum width at the time of setting the roll sheet 201 to the supporting portions 71. That is, the space area S is the operation area necessary for attaching the roll sheet 201. Accordingly, the retracted position of the reading apparatus 3 is designed to be such a position in which the reading apparatus 3 and the moving units 80 (the turning arms 81, the urging members 82, etc.) are retracted outward to the upper side or back side of the operation area (space area S).

Accordingly, by moving the reading apparatus 3 to the retracted position, it is possible to smoothly set the roll sheet 201 to the setting position without interfering with the reading apparatus 3 and the moving units 80. Therefore, the setting can be favorably performed.

On the other hand, in a case where the document reading operation is performed on the document 202 by the reading apparatus 3, the reading apparatus 3 is moved to the reading position as illustrated in FIG. 8. Here, the user places the leading edge of the document 202 on the document setting unit 31 and inserts the leading edge of the document 202 along the document setting unit 31 into the insertion slot 3A.

In a case where the reading apparatus 3 is at the reading position, a part of the lower part of the reading apparatus 3 is positioned inside the recessed portion 25 indicated by the dash-dotted line in FIG. 8. Here, the outer surface of the upper cover 24 in the closed position covering the upper part of the recording head 13 is at a position near the top surface of the document setting unit 31. Therefore, there is only a small level difference L between the outer surface of the upper cover 24 and the top surface of the document setting unit 31. That is, substantially, the outer surface of the upper cover 24 and the top surface of the document setting unit 31 are present at approximately the same position (height) in the vertical direction (Z direction). The upper cover 24 is provided at a height at which the opening and closing operations can be easily performed, and the top surface of the document setting unit 31 is positioned at approximately the same height as the upper cover 24.

Therefore, in a case of inserting the document 202 into the insertion slot 3A, the document 202 is placed on the document setting unit 31 which is at approximately the same height as the upper cover 24 and fed in the Y1 direction, so that the setting operation of the document 202 is easily performed. Furthermore, in the document setting operation and conveying operation in the Y1 direction, the document 202 is supported and guided not only by the document setting unit 31 but also by the upper cover 24. Accordingly, the area for supporting and guiding the document 202 is enlarged in the Y direction because of the upper cover 24. Therefore, the document setting can be favorably performed. Furthermore, as skewing of the document during the conveying operation is suppressed, conveyance precision is improved as well.

Furthermore, the upper cover 24 includes a curved surface portion 24a whose upstream part in the conveyance direction (Y1 direction) of the document 202 is curved downward in a case where the upper cover 24 is at the closed position. By forming the curved surface portion 24a as described above, it is possible to enlarge the length for supporting and guiding the document 202, compared to a case in which the upper cover 24 is formed linearly. Therefore, even though the length of the upper cover 24 in the conveyance direction (Y1 direction) is not sufficient, the document setting can be favorably performed without enlarging the size of the upper cover 24 in the Y direction.

Additionally, in the present embodiment, a temporary placement table 72 is used as a reading position regulating member on which a turning regulating member 84 of the reading apparatus 3 abuts, so that the reading apparatus 3 is held at the reading position. This is because the temporary placement table 72 has rigidity that is high enough to withstand the maximum weight of the roll sheet 201 and the roll holder 7, and therefore, even in a case where the temporary placement table 72 is abutted by the turning regulating member 84, it is possible to suppress deformation and stabilize the reading position.

Furthermore, the temporary placement table 72 is configured to protrude to a higher level, compared to the bottom surface of the recessed portion 25, so as to make the setting job of the roll sheet 201 easier. Therefore, as illustrated in FIG. 1 and FIG. 7, the reading apparatus 3 is configured to be in a size (length in the X direction) that can be arranged between the temporary placement tables 72, which are respectively arranged on both sides of the printing section 2. Furthermore, since the temporary placement tables 72 are configured to protrude upward, the turning regulating members 84 are accordingly provided on the connection members 83 that are arranged in the upper part of the reading apparatus 3. Therefore, even in a case where the turning regulating members 84 abut on the temporary placement portions 73 of the temporary placement tables 72 that are protruding upward, so that the reading apparatus 3 is held at the reading position, it is possible to approximately match the heights of the document setting unit 31 of the reading apparatus 3 and the upper cover 24 to make the level difference L small.

In a case where paper-jamming of the roll sheet 201 occurs in the printing section 2 or in a case of performing a replacement job of the recording head 13, the user needs to access the inside of the printing section 2. Therefore, the upper cover 24 is configured to be openable. By moving the upper cover 24 to the open position, the inside of the printing section 2 become accessible, and the paper-jamming treatment for the roll sheet 201 and the replacement job for the recording head 13 are made possible. Here, an explanation is given of the positional relationship between the upper cover 24 and the reading apparatus 3 with reference to FIG. 9 and FIG. 10.

FIG. 9 is a schematic cross-sectional view illustrating a state in which the upper cover 24 is moved about the rotational center 24b to the open position. In a case where the upper cover 24 is configured to be held in the open position as illustrated in FIG. 9, it is possible to open and close the upper cover 24 in such a manner that the upper cover 24 does not make contact with the reading apparatus 3 regardless of the position of the reading apparatus 3.

On the other hand, it is also possible that the upper cover 24 is configured such that the upper cover 24 can be moved to the open position as illustrated in FIG. 10 for reasons such as securing a larger operation space. However, in this case, if the upper cover 24 is opened in a state where the reading apparatus 3 is held at the reading position as illustrated in FIG. 8, the upper cover 24 abuts on the reading apparatus 3 before reaching the open position, and the upper cover 24 cannot be moved to the open position illustrated in FIG. 10.

Therefore, in a case where the upper cover 24 is moved to the open position in such a configuration in which the upper cover 24 makes contact with the reading apparatus 3 while being opened and closed, the following procedure is taken: first, the reading apparatus 3 is moved to the retracted position, and then the upper cover 24 is opened. Additionally, in a case where the reading apparatus 3 is moved to the reading position, it is necessary to move the upper cover 24 to the closed position before moving the reading apparatus 3.

Note that whether or not the open position of the upper cover 24 is designed to be such a position in which the upper cover 24 makes contact with the reading apparatus 3 is determined based on the size of the operation space required for a paper-jamming treatment and a replacement job of the recording head 13, the open angle of the upper cover 24, the position of the rotational center 24b of the upper cover 24, etc. Furthermore, the reading position of the reading apparatus 3 is also an element of determining the open position of the upper cover 24.

Note that it is preferable that the upper cover 24 in the closed position and the document setting unit 31 of the reading apparatus 3 in the reading position are in such a positional relationship as being displaced from each other in the Y direction. However, it is possible that a part of the document setting unit 31 of the reading apparatus 3 is configured to overlap the upper part of the upper cover 24, depending on the size of the reading apparatus 3 in the Y direction. In this case, in a case where the upper cover 24 is moved to the open position, the upper cover 24 should be opened after the document setting unit 31 of the reading apparatus 3 is moved.

As described above, in the present embodiment, the reading operation of the document 202 by the reading apparatus 3 is performed in the reading position, in which a part of the reading apparatus 3 is positioned inside the recessed portion 25 of the printing section 2. Therefore, it is possible for the user to perform an operation of setting and inserting the document 202 at a low position from the front side of the printing apparatus 1. Furthermore, by approximately matching the heights of the document setting unit 31 and the upper cover 24 to make the level difference L small, the document 202 can be supported and guided not only by the document setting unit 31 but also by the upper cover 24 of the printing section 2. Therefore, the document setting can be favorably performed. Moreover, it is possible to shorten the document setting unit 31 to make the reading apparatus smaller.

Additionally, in a case of setting the roll sheet 201 in the printing section 2, it is possible to move the reading apparatus 3 to the retracted position, which is outside the operation area (space area S) that is necessary for setting the roll holder 7 and the roll sheet 201. Therefore, in the setting operation of the roll sheet 201, the roll sheet 201 does not interfere with the reading apparatus 3. Thus, favorability in the setting of the roll sheet 201 can be improved.

Second Embodiment

Figure 11A:
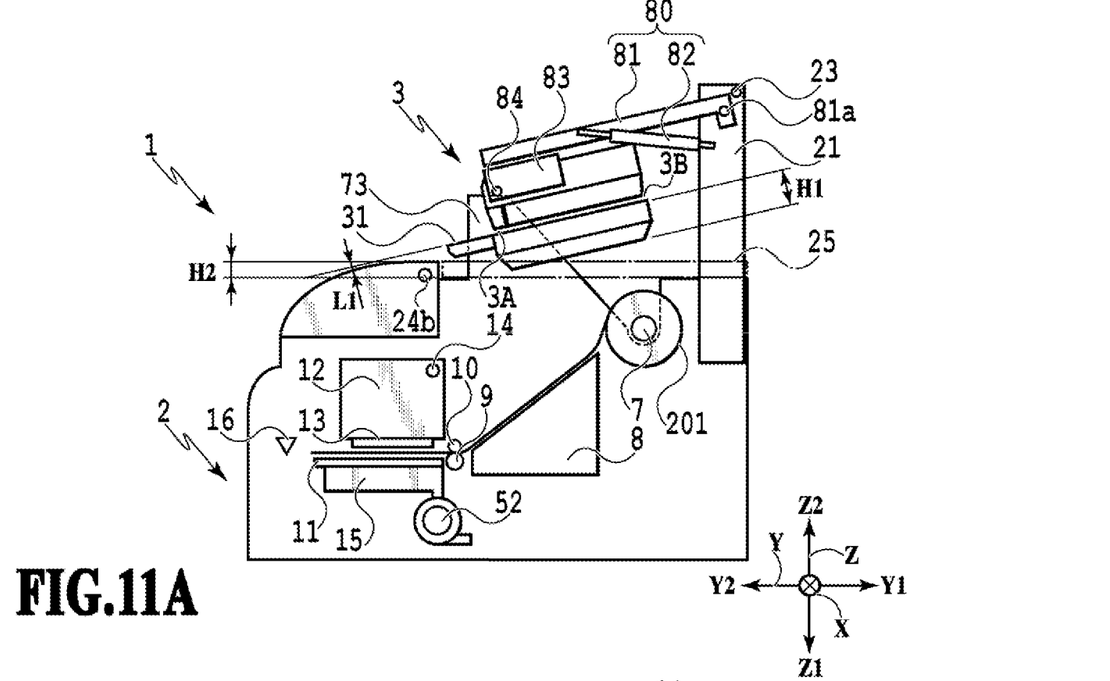
FIGS. 11A and 11B are schematic cross-sectional views illustrating states in which the reading apparatus is moved to the reading position in the second embodiment according to the present invention.
Figure 11B:
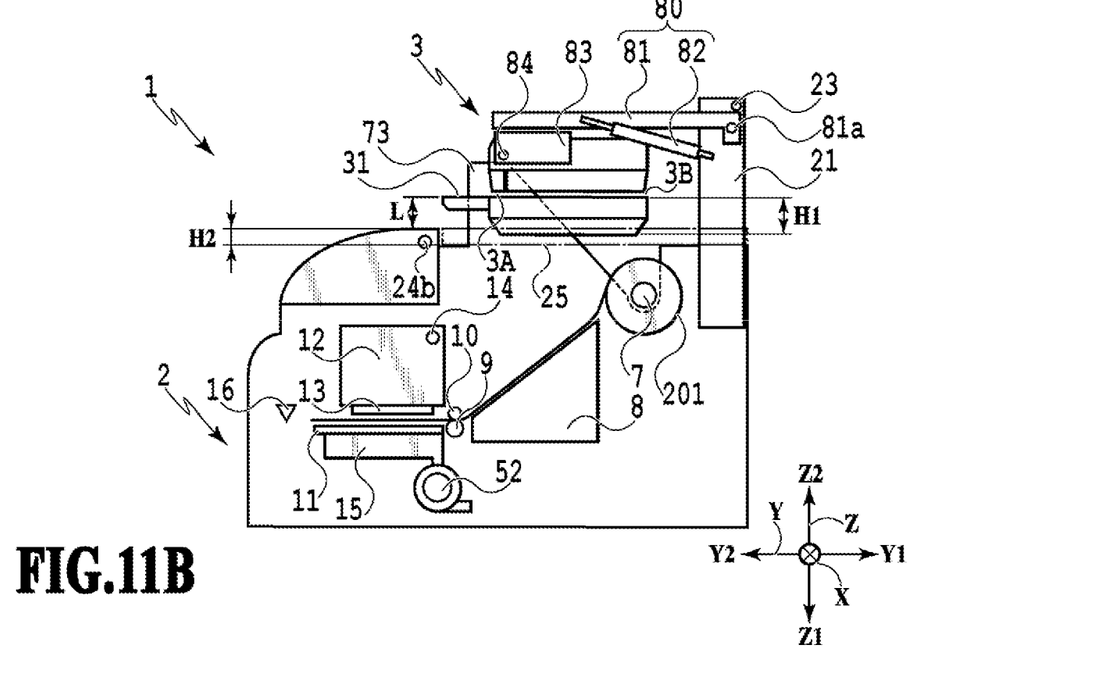

Next, an explanation is given of the second embodiment of the present invention with reference to FIGS. 11A and 11B. Note that the printing apparatus 1 illustrated in the second embodiment is different from the printing apparatus 1 illustrated in the first embodiment in the aspect of the reading position of the reading apparatus 3. However, the other aspects are the same as those of the first embodiment. Therefore, in FIGS. 11A and 11B, the same or corresponding parts as in the above-described embodiment are assigned with the same signs as well, so as to omit duplicated explanation.

Hereinafter, with reference to FIGS. 11A and 11B, the positional relationship of the reading apparatus 3 at the reading position in the second embodiment will be explained. FIGS. 11A and 11B are schematic cross-sectional views illustrating states in which the reading apparatus 3 is at the reading position in the printing apparatus 1 according to the second embodiment. Here, FIG. 11A is an example in which the reading apparatus 3 is arranged to be inclined at the reading position, and FIG. 11B is an example in which the reading apparatus 3 is arranged not to be inclined at the reading position.

In the example illustrated in FIG. 11A, in a case where the reading apparatus 3 is at the reading position, the reading apparatus 3 is arranged to be in a state in which the entire reading apparatus 3 is inclined such that the part of the upstream side in the conveyance direction (Y1 direction) of the reading apparatus 3 is positioned lower (Z1 direction) than the part of the downstream side. In this state, a part of the lower part of the reading apparatus 3 is positioned inside the recessed portion 25 illustrated by the dash-dotted line in FIG. 11A. In consideration of favorability in setting of the document 202, the angle (inclination angle) θ formed between the Y direction and the supporting surface 31a of the document setting unit 31 of the reading apparatus 3 is desirably 30° or less.

Here, an explanation is given of the reason why the reading apparatus 3 at the reading position is arranged in an inclined state. Since it is necessary to arrange the upstream side conveyance roller 32, the downstream side conveyance roller 35, etc., in the lower part of the reading apparatus 3, there is a limitation to making the height H1 between the top surface of the document setting unit 31 of the reading apparatus 3 and the bottom surface of the reading apparatus 3 shorter. Furthermore, if the height H2 of the recessed portion 25 of the printing section 2 is excessively enlarged, in a case where the roll holder 7 and the roll sheet 201 are installed on the temporary placement portions 73, there is a concern that favorability in the setting is deteriorated due to contact of the roll sheet 201 and the recessed portion 25.

Therefore, there may be a case in which the relationship between the thickness (height H1) from the supporting surface 31a of the document setting unit 31 to the bottom surface of the reading apparatus 3 and the height H2 of the recessed portion 25 of the printing section 2 is H1>H2. In this case, as illustrated in FIG. 11B, if the reading apparatus 3 is not inclined, the level difference L between the supporting surface 31a of the document setting unit 31 and the upper cover 24 is equal to or greater than (H1−H2). In a case where the level difference L becomes large, the upper cover 24 may not be able to properly support and guide the non-reading surface of the document 202. Note that the level difference L suitable for the upper cover 24 to support and guide the non-reading surface of the document 202 is within 30 mm.

On the other hand, as illustrated in FIG. 11A, by making the entire reading apparatus 3 inclined, it is possible to make the level difference L between the supporting surface 31a of the document setting unit 31 and the upper cover 24 less than (H1−H2). Accordingly, even in a case where the difference (L) between the height H2 of the recessed portion 25 of the printing section 2 and the thickness (height H1) of the reading apparatus 3 is larger than 30 mm, it is possible to make the level difference L between the supporting surface 31a of the document setting unit 31 and the upper cover 24 within 30 mm. Therefore, it is possible that the upper cover 24 properly supports and guides the non-reading surface of the document 202 together with the document setting unit 31.

As explained above, in the example illustrated in FIG. 11A, the reading apparatus 3 is arranged to be in a state in which the entire reading apparatus 3 is inclined such that the part of the upstream side in the conveyance direction (Y1 direction) of the reading apparatus 3 is positioned lower (Z1 direction) than the part of the downstream side. Therefore, even in a case where the thickness (height H1) from the supporting surface 31a of the document setting unit 31 to the bottom surface of the reading apparatus 3 is larger than the height H2 of the recessed portion 25 of the printing section 2, it is possible to reduce the level difference L between the supporting surface 31a of the document setting unit 31 and the upper cover 24. Accordingly, the non-reading surface of the document 202 can be supported by the upper cover 24 of the printing section 2 as well, not only by the document setting unit 31 of the reading apparatus 3. Therefore, the document setting can be favorably performed. Moreover, it is possible to shorten the document setting unit 31 to make the reading apparatus smaller.

Furthermore, even in the example in which the reading apparatus 3 is configured not to be inclined at the reading position as illustrated in FIG. 11B, in a case where the above-described level difference L is small (for example, within 30 mm), the document setting can be favorably performed because of the document setting unit 31 and the upper cover 24. In this case, it is possible to shorten the document setting unit 31 to make the reading apparatus smaller as well. Therefore, the example illustrated in FIG. 11B is included in the present invention as well.

Further, in a case where the reading apparatus 3 is configured not to be inclined at the reading position, it is possible that the height of the top surface of the upper cover 24 in the closed state is enlarged upward, so as to reduce the level difference from the supporting surface 31a of the document setting unit 31 at the reading position.

Other Embodiments

In the above embodiments, a moving unit 80 that moves the reading apparatus 3 to the reading position and to the retracted position is configured to move the reading apparatus 3 in the pivotal movement direction. However, the moving unit may be configured to slide the reading apparatus 3 in the Z direction (up and down direction).

Furthermore, in the examples of the above-described embodiments, a turning regulating member 84 of the reading apparatus 3 is provided on a connection member 83. However, the turning regulating member may be provided on the turning arm 81 provided on the moving unit 80 of the reading apparatus 3. Moreover, although a temporary placement table 72 for supporting the roll holder 7 is used as a reading position regulating member that abuts on a turning regulating member 84 of the reading apparatus 3 so as to determine the reading position of the reading apparatus 3 in the above examples, a reading position regulating member that abuts on the turning regulating member 84 may be provided separately from the temporary placement table 72. In a case where the temporary placement table 72 and the reading position regulating member are separately formed, although it is possible to provide the reading position regulating member at a higher position than the bottom surface of the recessed portion 25 as in the above-described embodiments, it is also possible to provide the reading position regulating member on the bottom surface of the recessed portion 25. In a case of providing the reading position regulating member on the bottom surface of the recessed portion 25, it is preferable that the turning regulating member 84 of the reading apparatus 3 is provided on the bottom surface of the reading apparatus 3. Then, by properly setting the contact position of the turning regulating member 84 and the reading position regulating member in the vertical direction, it is possible to reduce the level difference L between the document setting unit 31 and the upper cover 24. Accordingly, it is possible to shorten the document setting unit to make the reading apparatus smaller while maintaining favorability in setting of a document in the reading apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006875 filed Jan. 18, 2019, which is hereby incorporated by reference herein in its entirety.

What is claimed is:

1. A printing apparatus comprising:
a supporting portion configured to support a sheet;
a printing unit configured to perform printing on the sheet supplied from the supporting portion;
a document reading apparatus including a document setting unit and a reading unit, the document reading apparatus being provided at a higher position compared to that of the printing unit, the document setting unit including a supporting surface configured to support a document, the reading unit being configured to read the document conveyed from the document setting unit,
wherein the document reading apparatus moves to a reading position, at which reading of the document is performed, and to a retracted position, at which the document reading apparatus is retracted from the reading position; and
a cover member that is partially at a higher position compared to that of a lower part of the document reading apparatus, the cover member being configured to cover the printing unit,
wherein the cover member includes an outer surface configured to support and guide the document together with the supporting surface in a case where the document reading apparatus is at the reading position.

2. The printing apparatus according to claim 1, wherein the retracted position is outside a space in which the sheet moves in a case where the sheet is set to the supporting portion.

3. The printing apparatus according to claim 1, wherein the document reading apparatus reads the document while conveying the document in a predetermined conveyance direction.

4. The printing apparatus according to claim 1, wherein the cover member is movable to a closed position, at which the cover member covers the printing unit, and to an open position, at which the printing unit is open.

5. The printing apparatus according to claim 4, wherein, in a case where the document reading apparatus is at the reading position, the cover member is movable to the closed position and to the open position without making contact with the document reading apparatus.

6. The printing apparatus according to claim 5, wherein, in the case where the document reading apparatus is at the reading position, the document setting unit is at a position at which the document setting unit does not overlap with the cover member.

7. The printing apparatus according to claim 1, wherein, in a case where the document reading apparatus is at the reading position, the document setting unit is at a position at which the document setting unit overlaps with the cover member.

8. The printing apparatus according to claim 1, wherein the cover member includes a curved surface portion whose upstream part in the conveyance direction of the document is curved downward in a case where the cover member is in a state of covering the printing unit.

9. The printing apparatus according to claim 1, wherein the document reading apparatus is held in such a manner that the document reading apparatus is movable to the reading position and to the retracted position by use of a moving unit provided on a side part of the document reading apparatus.

10. The printing apparatus according to claim 1,
wherein the printing unit includes a guiding member configured to guide the sheet moving from outside to the supporting portion, and
wherein the sheet guided by the guiding member moves in a space formed in the printing unit.

11. The printing apparatus according to claim 10, wherein the guiding member includes a temporary placement portion configured to support the sheet.

12. The printing apparatus according to claim 1, wherein the printing unit includes a reading position regulating member configured to support the document reading apparatus at the reading position.

13. The printing apparatus according to claim 12,
wherein the reading position regulating member is configured with a guiding member configured to guide the sheet moving from outside to the supporting portion, and
wherein the document reading apparatus is supported at the reading position by a temporary placement portion configured to support the sheet.

14. The printing apparatus according to claim 3, wherein the document setting unit is inclined in such a manner that a part of an upstream side of the document setting unit in the conveyance direction is at a lower position compared to a part of a downstream side of the document setting unit in the conveyance direction.

* * * * *